United States Patent [19]

Mister et al.

[11] Patent Number: 5,053,964
[45] Date of Patent: Oct. 1, 1991

[54] ON-BOARD INTEGRATED VEHICLE CONTROL AND COMMUNICATION SYSTEM

[75] Inventors: Jean M. Mister; Richard Carlsen, both of Ontario, Canada

[73] Assignee: Utdc, Inc., Ontario, Canada

[21] Appl. No.: 379,798

[22] Filed: Jul. 17, 1989

[51] Int. Cl.⁵ ............ B61L 27/00; G06F 15/50
[52] U.S. Cl. .............. 364/424.01; 364/436; 364/132; 246/187 C
[58] Field of Search .......... 364/424.01, 424.05, 364/424.04, 426.05, 436, 132, 138; 246/187 C

[56] References Cited

U.S. PATENT DOCUMENTS

| 4,015,804 | 4/1977 | Dobler et al. | 364/436 |
|---|---|---|---|
| 4,023,753 | 5/1977 | Dobler | 364/436 |
| 4,041,470 | 8/1977 | Slase et al. | 364/424.04 |
| 4,247,897 | 1/1981 | McDonald et al. | 364/436 |
| 4,266,273 | 5/1981 | Dobler et al. | 364/436 |
| 4,344,364 | 8/1982 | Nickles et al. | 105/62.1 |
| 4,401,035 | 8/1983 | Spigarelli et al. | 105/61 |
| 4,437,415 | 4/1982 | Rush et al. | 364/436 |

FOREIGN PATENT DOCUMENTS

| 43665 | 1/1982 | European Pat. Off. |
| 58-69408 | 4/1983 | Japan |
| 596703 | 1/1984 | Japan |
| 59-123401 | 7/1984 | Japan |
| 60-109705 | 6/1985 | Japan |

OTHER PUBLICATIONS

Von Kurt Backer et al., Neue Wendezuge Rhein-Ruhr Mit Zeitmultiplexer Wendezugsteuerung, 2089 BBC Nachrichten vol. 62, (1980) No. 8/9, Mannheim, Deutschland, pp. 340-355.

Primary Examiner—Thomas G. Black
Attorney, Agent, or Firm—Spencer & Frank

[57] ABSTRACT

A train comprising a plurality of interconnected revenue carrying vehicles is provided. Each of the vehicles includes a controller for controlling the various sub-systems in the vehicle. When the vehicles are coupled to form a train, the controller in one of the vehicles operates as a master and controls the operation of the other vehicles in the train. The controllers in the other vehicles operate as slaves and are responsive to control signals generated by the master. Software is included in the controllers to allow the master role to be transferred between vehicles without disabling the train.

31 Claims, 11 Drawing Sheets

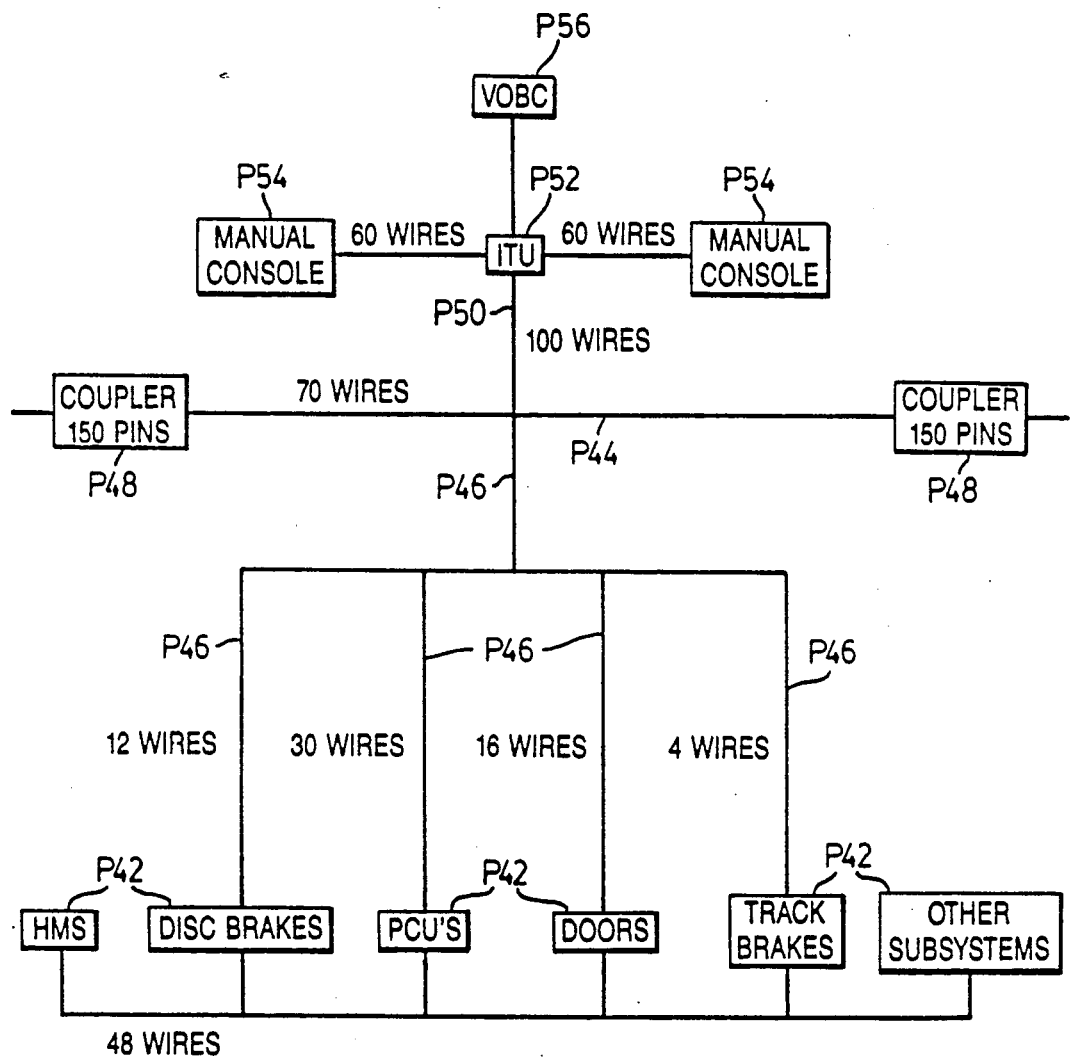
(Prior Art) FIG. 11

ON-BOARD INTEGRATED VEHICLE CONTROL AND COMMUNICATION SYSTEM

The present invention relates to control systems and in particular to an on-board integrated vehicle control and communication system.

On-board control and communication systems for use in vehicles are known in the art. Traditionally, vehicles such as for example subway train cars and light rapid transit (LRT) cars have been designed so that they can be operated as a single independent unit or can be coupled to other vehicles to form a train. Generally, each car is provided with a bulky and expensive control and communication system. These control and communication systems typically include a large hardware based central controller which communicates with a plurality of hardware based vehicle sub-control units. The central controller is connected to each vehicle sub-control unit via a coupling connector and a plurality of cables, each cable housing a large number of copper wires. The vehicle sub-control units operate the various systems in the vehicle such as for example, the door operation system, the HVAC system, the vehicle propulsion unit, etc. in response to control signals received from the central controller.

When a plurality of vehicles are connected to form a train, one of the vehicles, normally the lead vehicle, is designated as the master. The central controller in the designated master controls the movement of the train as well as the operation of the sub-control units in each of the vehicles.

However, a problem exists in these control and communication systems. Since there are a plurality of sub-control units disposed on each vehicle and since a number of large cables are required to connect each sub-control unit through vehicle coupling connectors to the central controller, this type of on-board control and communication system is expensive and prone to malfunction. Furthermore, another problem exists in that since the large hardware components and bulky wiring must be housed in the vehicle, the revenue capacity of the vehicle is reduced. Furthermore, still yet another problem exists in that if the designated master fails, the train becomes disabled until the designated master is manually disabled from the master role and another vehicle is designated as the master.

It is therefore an object of the present invention to provide a novel vehicle control system.

According to the present invention there is provided an on-board control and communication system for use on a vehicle, said vehicle being capable of operating as a single unit or being coupled to at least one other vehicle to form a train, one of said vehicles in said train operating as a master for controlling the operation of said train and the other vehicles operating as slaves responsive to said master, each of said vehicles including a control and communication system, said system comprising:

at least one slave control means responsive to command signals and controlling a sub-system of said vehicle in accordance with said command signals;

master control means connected to said slave control means via a communication link, said master control means generating said command signals upon reception of an enabling signal in response to desired vehicle operation, said communication link capable of being coupled to the communication link in other vehicles when vehicles are coupled to form a train;

detection means for detecting when said vehicle is coupled to another vehicle to form a train and for detecting which of said vehicles in said train is designated as said master; and conversion means in communication with said detection means for generating said enabling signal when said vehicle is detected as being said master.

Preferably, the control means includes a microprocessor based master controller and a plurality of microprocessor based slave controllers, each slave controller being responsive to command signals received from the master controller. The slave controllers control the various sub-systems in the vehicle in response to the command signals.

In another aspect of the present invention there is provided an on-board control and communication system for use on a vehicle comprising:

operator control means operable to control the operation of said vehicle in response to commands generated by an operator;

automatic control means operable to control the operation of said vehicle in a pre-programmed manner;

mode selection means in communication with said operator and automatic control means, said mode selection means being operable between first and second conditions to enable one of said operator or automatic control means; and monitoring means for monitoring said mode selection means, said monitoring means detecting conditioning of said mode selection means from one condition to the other condition, said monitoring means automatically enabling the control means associated with said other condition and disabling the control means associated with the one position without disabling said vehicle.

In still yet another aspect of the present invention there is provided an on-board control and communication system for use on a vehicle comprising:

at least one slave control means responsive to command signals and communicating with a sub-system of said vehicle, said slave control means operating said sub-system in accordance with said command signals master control means connected to said slave control means via a communication link, said mater control means controlling the operation of said vehicle and generating said command signals in response to desired vehicle operation, said master control means communicating with an operator console or a preprogrammed controller and receiving signals representing said desired vehicle operation therefrom whereby each of said master and slave control means one in the form of a modular micro-processor based circuit and wherein said communication link is a multiplex communication channel.

Preferably, the master and slave control means are in the form of remote control interface units (RCIUs) comprising a modular microprocessor based circuit to facilitate the replacement thereof if required.

In still yet another aspect of the present invention there is provided a train comprising:

at least two interconnected vehicles, one of said vehicles operating as a master and controlling the operation of said train, the other vehicles operating as slaves and being responsive to said master, each of said vehicles comprising:

a communication link operable to engage with the communication link in another vehicle when vehicles are interconnected to form a train;

control means capable of controlling the operation of said train when said vehicle is designated as said master and operable to control said vehicle in response to commands generated by said master when said vehicle is designated as a slave;

request means in communication with said control means and being operable when said vehicle is operating as a slave, said request means generating a master request signal in response to operation control;

detection means for detecting said request when said vehicle is operating as said master; and conversion means for converting said master to a slave upon detection of said request and converting said slave to said master upon generating of said request automatically without disabling said train.

In still yet a further aspect of the present invention there is provided a train comprising:

at least two interconnected vehicles, one of said vehicles operating as a master and controlling the operation of said train, the other of said vehicles operating as slaves and being responsive to said master, said master including control means generating commands addressed to particular slaves, each of said slaves including control means operable in accordance with commands generated by said master addressed thereto, said master vehicle including monitoring means for continuously monitoring said train to determine the number of vehicles in said train and generating an address list including each of said detected vehicles and update means for updating said address list automatically upon addition or subtraction of a vehicle from said train.

control means capable of controlling the operation of said train when said vehicle is designated as said master and operable to control said vehicle in response to commands generated by said master when said vehicle is designated as a slave.

The present control system provides advantages in that typical hardware control equipment is reduced and replaced by the RCIU software control. Furthermore, the typical bundled copper wire conductors are eliminated by the provision of the multiplex communication link. These provisions reduce wiring, costs, space requirements and complexity. Moreover, the present system standardizes the modules and interfaces in the vehicle since the various RCIUs differ only in software control and Input/Output counts. Also, the design of the communication link and the RCIUs accommodates expansion to allow additional vehicle control systems to be added to the system and controlled in a similar manner.

This design provides further advantages in that all of the signals for the train are conveyed over the multiplex communication link in a common readable form. These provisions allow any RCIU to assume the master role of a vehicle and also allow the master unit of a train to be automatically switched to another vehicle without disabling the train. Moreover, the software control allows nodes (vehicles) to be added to or subtracted from the train without adversely effecting train vehicle communications.

An embodiment of the present invention will now be described by way of example only with reference to the accompanying drawings in which:

FIG. 11 is a block diagram of a prior art control system.

Figure 1:
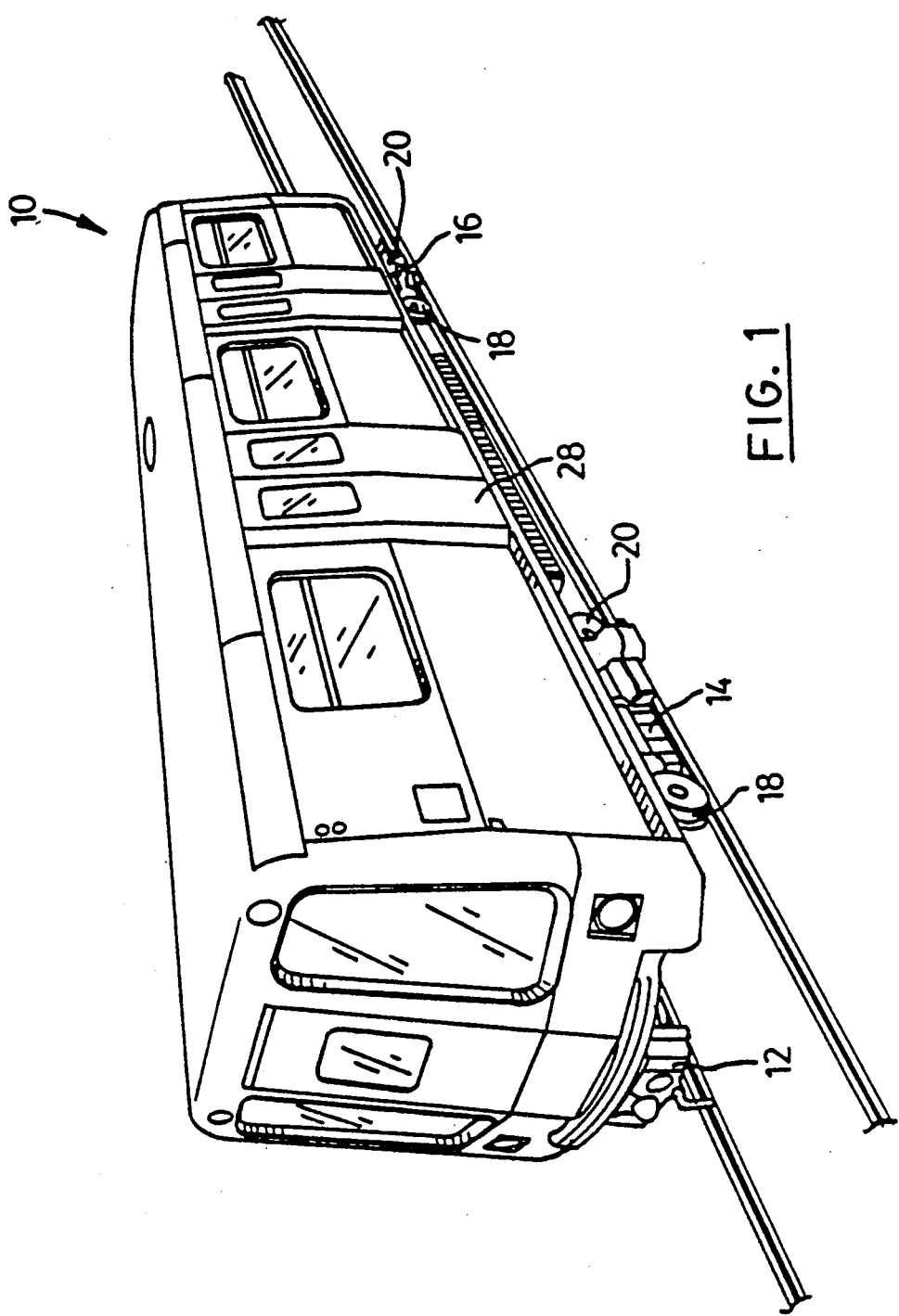
FIG. 1 is a perspective view of a vehicle.
Figure 2A:
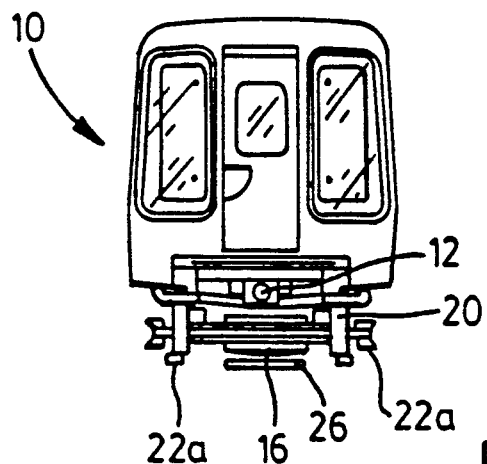
FIGS. 2a and 2b, are rear and front views of the vehicle illustrated in FIG. 1.
Figure 2B:
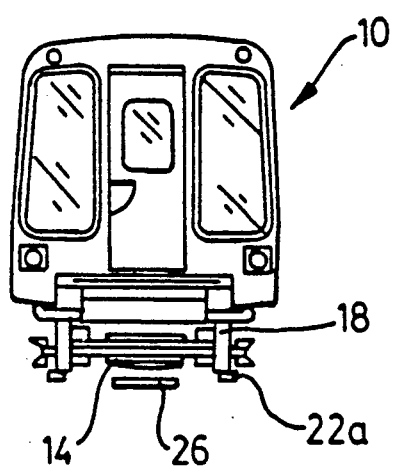
Figure 3:
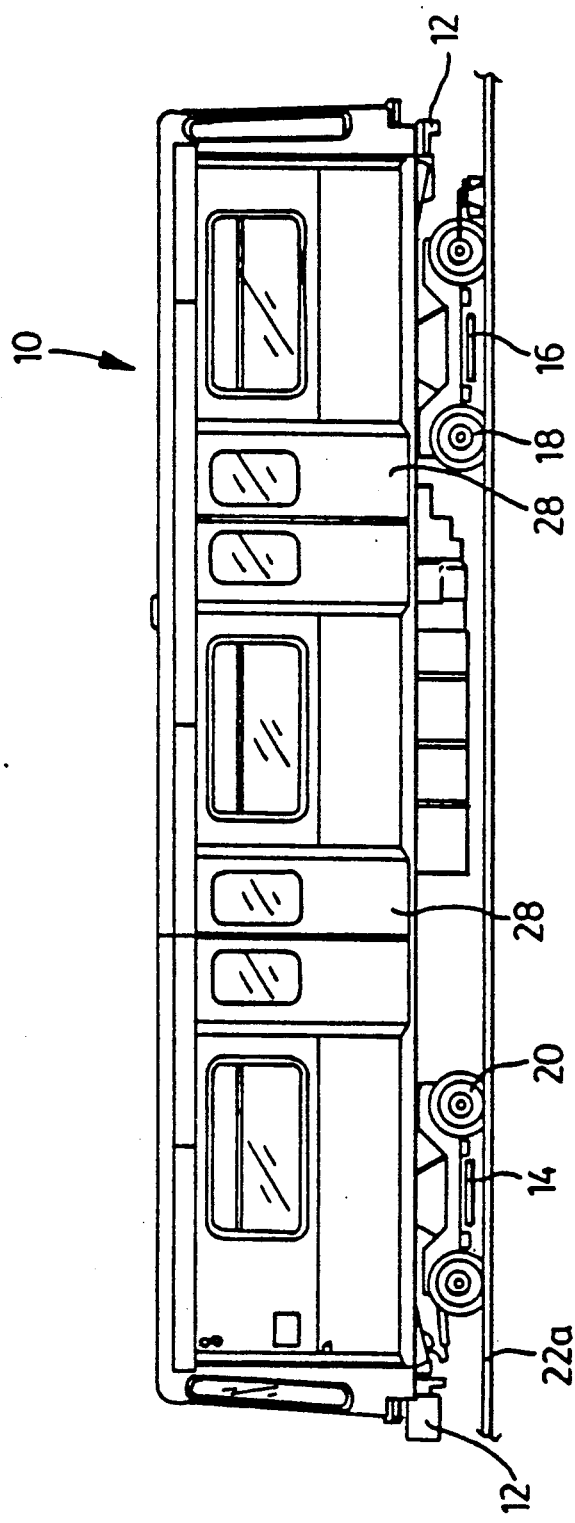
FIG. 3 is a side view of the vehicle shown in FIG. 1.
Figure 4:
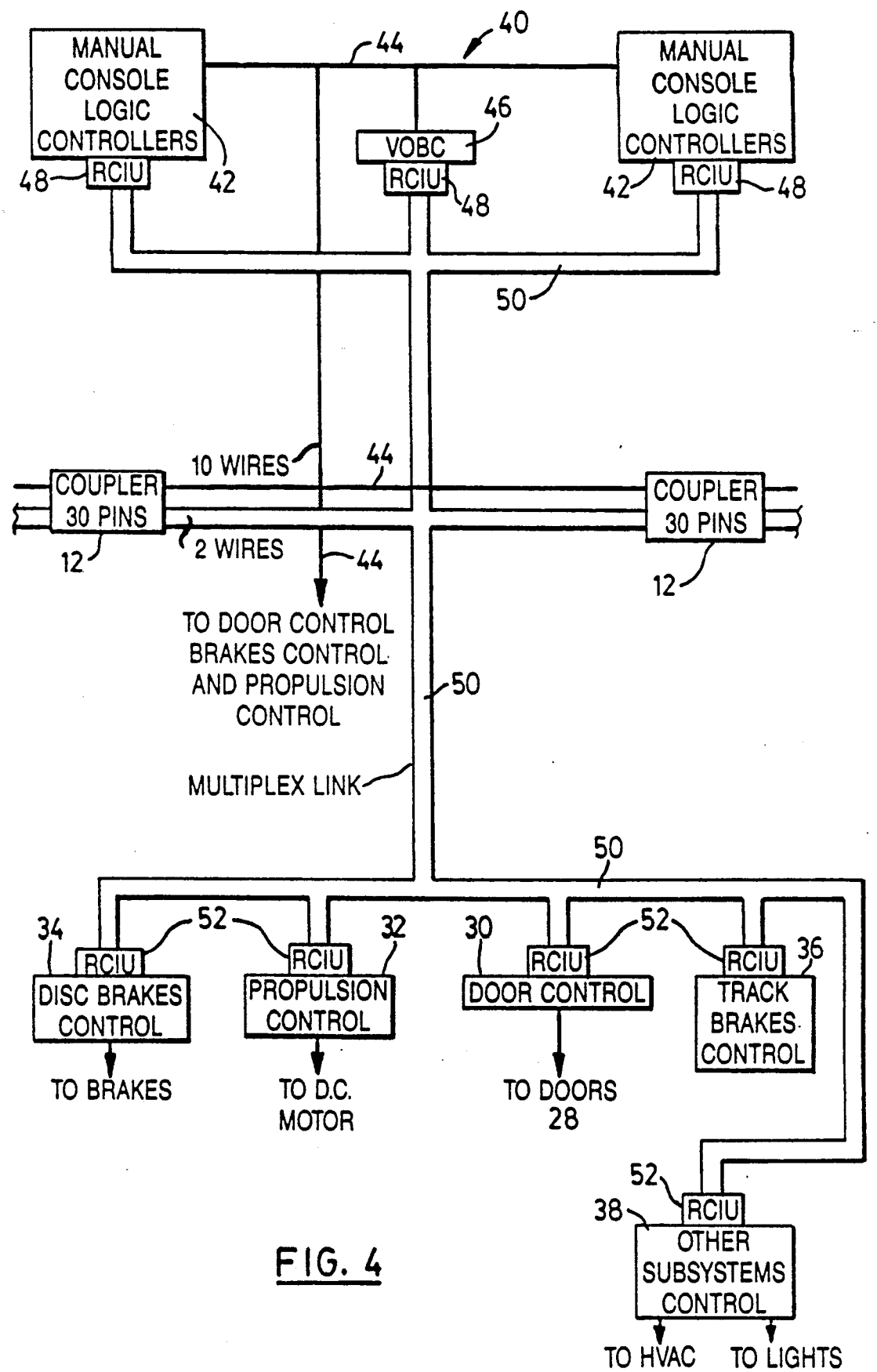
FIG. 4 is a block diagram of a control system used in the vehicle illustrated in FIG. 1.

Referring to FIGS. 1 to 6, a revenue carrying vehicle 10 is shown. The vehicle 10 can be interconnected via mechanical and electrical couplers 12 located at both ends of the vehicle 10 to other similar vehicles to form a train. Each of the vehicles 10 includes a pair of trucks 14, 16, each truck being located at opposite ends of the vehicle 10. Each truck supports a pair of wheelsets 18, 20 spaced along the longitudinal axis of the vehicle 10. The wheelsets 18, 20 rest on the rails 22a of a track 22.

Each vehicle 10 is also provided with linear induction motor (LIM) primaries (not shown) which cooperate with a reaction rail 26 extending between the rails 22a of the track 22. The LIM primaries are operable to provide thrust to the vehicle 10 in a known manner. Since the operation of linear induction motors is well known in the art, the operation thereof will not be discussed any further herein.

In the embodiment shown, the vehicle 10 is similar to any common subway or light rapid transit car are includes at least one set of doors 28 on each side of the vehicle for allowing passengers to enter or other revenue to be placed in the vehicle 10. A door controller sub-system 30 is housed in the vehicle 10 and controls the movement of the doors 28 between open and closed positions in a known manner. A propulsion sub-system 32 and braking sub-systems 34, 36 are also disposed on the vehicle 10. The sub-systems 32 to 36 are also conventional and control the movement of the vehicle 10 in a known manner. Other sub-systems 38 such as a lighting sub-system and a heating, ventilation and air conditioning (HVAC) sub-system are included on the vehicle 10 to maintain environment control in the vehicle.

Figure 5:
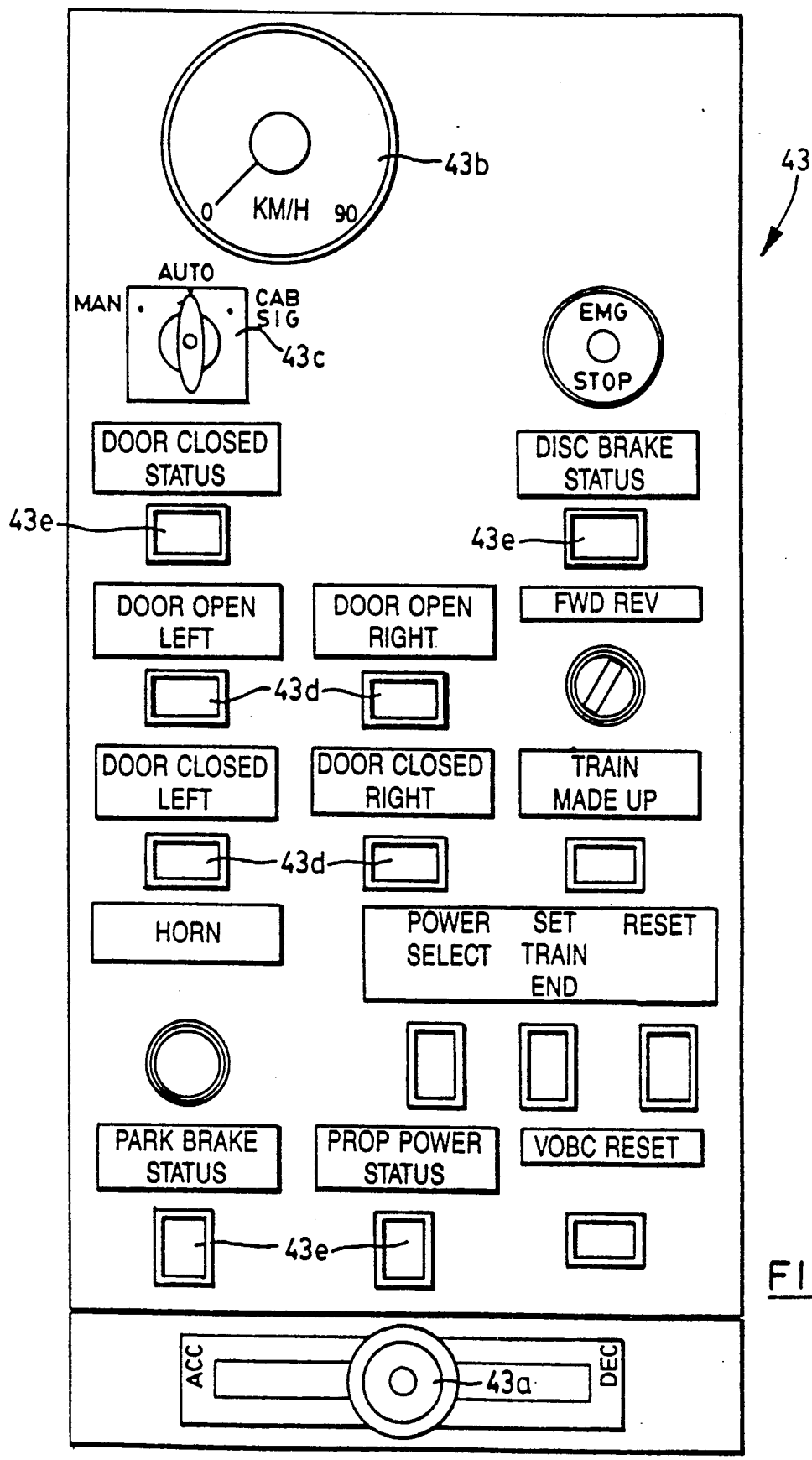
FIG. 5 is a front view of a control panel provided in the vehicle illustrated in FIG. 1.

The vehicle 10 includes two operator manual console logic controllers 42 forming part of an integrated vehicle control and communication system (IVCCS) 40, the controllers 42 being located at opposite ends of the vehicle 10. A manual console 43 is located at each of the manual console logic controllers 42 to allow an operator to control manually or override the operation of the various sub-systems 30 to 38 disposed on the vehicle 10. Referring now to FIG. 5, one of the manual consoles 43 is better illustrated. The console 43 includes a throttle 43a and a vehicle speed indicator 43b which operate in a conventional manner. A mode selection switch 43c is included and allows an operator to select the mode of operation of the vehicle, the modes being manual (man), automatic (auto) and cab signalling (cab sig). Door open switches 43d are provided to allow the operator to control the door controller sub-system 30 so that the doors 28 may be moved between open and closed positions. Various indicator lights 43e are provided along with other conventional controls to allow an operator to control all aspects of the vehicle 10.

The manual console logic controllers 42 communicate with the consoles 43 and interpret operation of the console controls in a known manner. The console logic controllers 42 in turn generate control signals in response to actuation of the various console controls. If the automatic mode of operation is selected for the vehicle, both manual console logic controllers 42 and consoles 43 are disabled until a new mode of operation is selected by moving the mode selection switch 43c at an active console 43 to another position (i.e. man or cab sig). Control of the vehicle in the automatic mode is carried out by a vehicle on-board controller (VOBC) 46. The VOBC 46 includes a memory which stores pre-determined vehicle operation information. The VOBC 46 generates control signals in response to the pre-determined operation information to control the vehicle 10 in a pre-determined manner.

When the manual or cab signalling mode is selected via the manual console 43 at one of the manual console logic controllers 42, the operation of the vehicle 10 is controlled by the operator stationed at the manual console. However, during the cab signalling mode, although the operator controls the operation of the vehicle 10, the VOBC 46 conveys the pre-determined operation information to the console 43 to allow the operator to see the manner in which the vehicle is programmed to operate.

The manual logic controllers 42 are interconnected via a hardwire (vital signals) link 44. The hardwire link 44 also extends to the vehicle on-board controller 30 (VOBC) 46. Each of the manual console logic controllers 42 and the VOBC 46 are as mentioned previously conventional vehicle systems and are in communication with individual remote control interface units (RCIU) 48. The RCIUs 48 receive the control signals generated by the console logic controllers 42 or the VOBC 46 depending on the selected mode of vehicle operation and condition the control signals before they are transmitted to the various sub-systems 30 to 38 on the vehicle 10 as will be described. The RCIUs 48 in communication with the console logic controllers 42 and the VOBC 46 are interconnected via a multiplex communication link 50 comprising a shielded twisted copper pair.

The communication link 50 extends from the RCIUs 48 across the length of the vehicle 10 to interconnect each of the couplers 12. This permits the communication link 50 of one vehicle 10 to be connected to the communication link 50 of another similar vehicle when two or more vehicles are interconnected to form a train. The communication link 50 also extends to a plurality of other RCIUs 52 disposed on the vehicle 10, each of the other RCIUs 52 being associated with one of the vehicle sub-systems 30 to 38. Each RCIU 52 is connected to its associated sub-system and provides control signals thereto so that the sub-systems can be operated in the desired manner. The hardwire (vital signs) link 44 also extends across the vehicle 10 to interconnect the two couplers 12 and extends to the door controller sub-system 30, the braking sub-systems 34, 36 and the propulsion sub-system 32. This permits emergency commands generated by the operating console logic controller 42 or VOBC 46 to communicate directly with these sub-systems on the vehicle 10.

Each of the remote control interface units (RCIUs) 48, 52 is in the form of a microprocessor-based circuit including an INTEL 8044AH integrated circuit (IC) implementing an INTEL 8044 "BitBus" serial data bus system. The INTEL 8044AH IC incorporates an INTEL 8046 micro-controller having an intelligent serial communication controller or serial interface unit (SIU). Resident firmware in the 8044 microcontroller manages task execution and interrupt handling through a multilevel priority structure. Functions which require near immediate attention are placed within tasks of high priority. Each of the RCIUs 48, 52 is substantially identical and of a modular design to facilitate the replacement thereof and to permit additional RCIUs to be connected to the communication link 50 without adversely affecting the system 40. The INTEL "BitBus" system is suitable for use in serial multi-node distributed intelligent systems and therefor possesses the necessary capabilities to permit structured communications along the communication link 50 between the RCIUs 48, 52.

Although known in the art, a brief description of the INTEL "BitBus" system is provided to clarify the operation of the IVCCS 40. The INTEL "BitBus" allows approximately 250 nodes to be interconnected and permits communications to occur between each of the 250 nodes. Communications between the nodes in the "BitBus" system are governed by a selected protocol which determines the rules of communications between the nodes. In the "BitBus" structure, one of the nodes in the system is designated as a master whilst the other nodes in the system are designated ass slaves. The protocol in the "BitBus" system allows the designated master to control all communications in the system.

Figure 6:
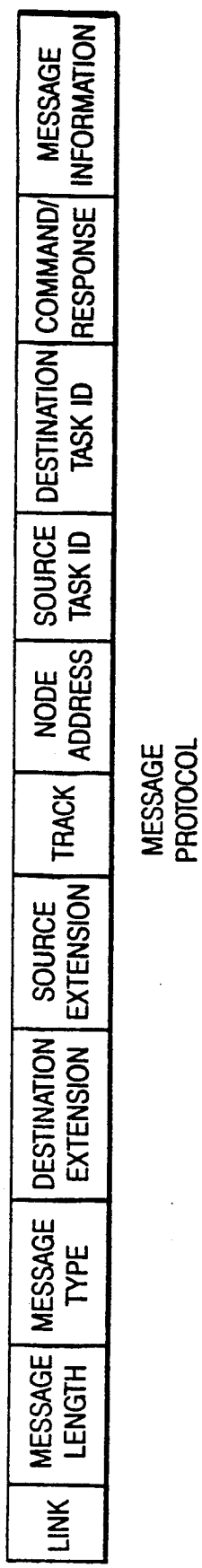
FIG. 6 is an illustration of a message transmitted by the control system shown in FIG. 4.

Thus, the selected master node determines the operation of the slave nodes by supplying appropriate commands thereto. Each command generated by the master is addressed to a particular slave. The selected master allows the slave nodes to respond to the master to confirm execution of the command. Similarly when a slave replies to the master, the reply is addressed to the master so that only the master responds to the transmitted message. Accordingly, the protocol or message structure used in the "BitBus" system, pads a data message to be transmitted between two nodes with address information, error correction information and information concerning whether the transmitted data message is a command generated by the master or a reply transmitted by a slave. FIG. 6 illustrates a typical message structure transmitted along an INTEL "BitBus" system. When a message is generated by the master and received by the slave to which the message is addressed, the data message portion of the transmitted message is used by the slave node and the slave node executes the command. If message corruption occurs over the "BitBus" system, the transmitted message is ignored by all nodes in the system.

In the present system 40, each of the RCIUs 48, 52 are considered as nodes by the INTEL "BitBus" system and communications therebetween occur over the communication link 50. The master RCIU on a vehicle 10 is determined by the mode of operation selected by the mode selection switch 43c at active manual console 43. Thus, for a single vehicle 10, when the manual mode or cab signalling mode of operation signal is selected at an active manual console 43, the RCIU 48 connected to the console logic controller 42 associated with the console 43 is designated as the master node and controls all communications in the vehicle 10. When the automatic mode of operation is selected, the RCIU 48 connected to the VOBC 46 operates as the master node in the system 40. All other RCIUs 48,52 disposed on the vehicle function as slaves once a master has been selected.

When two or more vehicles 10 are interconnected to form a train, either the RCIU 48 connected to one of the manual console logic controllers 42 or the RCIU connected to the VOBC 46 on one of the vehicles 10 is designated as the master. All other RCIUs 48,52 in the train will assume a slave role. Since each of the RCIUs 48,52 are substantially identical, each RCIU disposed on a vehicle is capable of assuming the master role. However, in this embodiment only the RCIUs 48 are able to control the operation of the vehicle 10 completely. Thus, only these RCIUs are permitted to assume the master role.

The RCIUs 48 include an active variable which can be cleared and set and an active line in communication with the mode selection switch 43c at each console 43. The RCIUs 48 also include software for monitoring the active line to detect a change in state from low to high thereon which signifies that the selected mode of operation of the vehicle 10 has been changed and that the RCIU 48 detecting the change of state on it's associated active line is to assume the master role. Moreover, the RCIUs 48 include software that permits the master role to be transferred between RCIUs when a change in the selected mode of operation is detected and permits the master RCIU to transfer the master role to another RCIU 48 without a request having been generated. The operation of the software will be described in more detail hereinafter. The RCIUs 48 also monitor the communication link 50 when two or more vehicles are interconnected to form a train to detect requests for the transfer of the master role by one of the RCIUs 48 disposed on one of the vehicles in the train.

Each of the RCIUs 48, 52 and particularly RCIUs 52 include pre-determined operation information which is stored in the memory therein. This information is used by the RCIU to control the sub-system connected thereto in accordance with the pre-determined operation information in the event of failure of the communication link 50 which isolates the RCIU from the master RCIU 48. This permits the vehicle 10 to operate without requiring shut down of the system 40 in the event of failure of one of the RCIUs (nodes) in the system. This is particularly useful when a non-critical sub-system becomes disabled from the master RCIU 48. It should be apparent that when a critical sub-system such as for example the propulsion or braking sub-systems 32 to 36, the pre-determined operation information causes the RCIU to control the sub-system in a manner to bring the vehicle to a stop.

Also, since the "BitBus" system is designed so that corrupted message transmitted between nodes over the communication link 50 are ignored by all nodes in the system, the RCIUs 48,52 are provided with software for detecting this type of data transmission failure. This allows the IVCCS 40 to determine message transmission failure that typically would not be detected in the "BitBus" environment and ensures that vehicle control is maintained at a high level. Details of this type of message transmission failure detection will be described hereinafter.

Referring to FIG. 11, a prior art vehicle control and communication system P40 is shown. As should be noted, the prior art system includes a plurality of vehicle control sub-system units P42. Each of the units P42 is connected to a 70 wire cable P44 via a multi-conductor cable P46. The cable P44 extends across the vehicle to interconnect the couplers P48 located at each end of the vehicle. A 100 wire cable P50 extends from the cable P44 and connects to an intertrain unit (ITU) or relay bank P52. Operator consoles P54 and a VOBC P56 are also connected to the ITU P52 via multi-conductor cables P58 to allow the vehicle to be operated in the desired manner. In the prior art system P40, the vehicle control signals generated either by the consoles P54 or the VOBC P56 are conveyed directly to the vehicle sub-system via a direct hardwire connection.

It should be realized that the present system 40 removes the need for the large number of wires shown in the prior art system P40 by using the RCIUs 48,52 and interconnecting them via a two wire communication link. Rather than by directly connecting the VOBC 46 or console logic controllers 42 to each of the sub-systems on the vehicle, all control signals generated by either the VOBC 46 or one of the console logic controllers 42 are converted by an RCIU into a message structure which can be addressed to a particular sub-system and transmitted over the two wire communication link. This reduces complexity of the system 40 as compared with the prior art system. Furthermore, since software control is used in the present system, the RCIUs and associated vehicle control sub-systems 30 to 38 are electrically simplified as compared with the controllers P42 yet perform the same and additional functions as will be described herein.

The operation of a vehicle operated as an independent single unit will now be described with particular emphasis to the IVCCS 40 and with reference to FIGS. 7 to 10. When the vehicle 10 is to be operated, the vehicle is powered so that the IVCCS 40 resets. Thereafter, the active variable lines extending from the mode selection switch 43c at each console logic controller 42 are monitored by the RCIUs 48 connected thereto to determine the selected mode of operation of the vehicle. Once the selected mode of operation for the vehicle is known, the master node or master RCIU 48 is determined. Thus, for example when the automatic mode is selected using the switch 43c at an active console 43, the RCIU 48 connected to the VOBC 46 functions as the master in the "BitBus" system. If the manual or cab signalling mode of operation is selected at an active console 43, the RCIU 48 connected to the console logic controller 42 associated with the console 43 functions as the master. Once the master RCIU 48 has been determined, all other RCIUs 48,52 on the vehicle 10 operate as slaves. However, the RCIUs 48 operating as slaves continuously monitor the active variable line associated therewith to detect a change in position of the mode selection switch 43c which signifies a request to transfer the master role.

Figure 7:
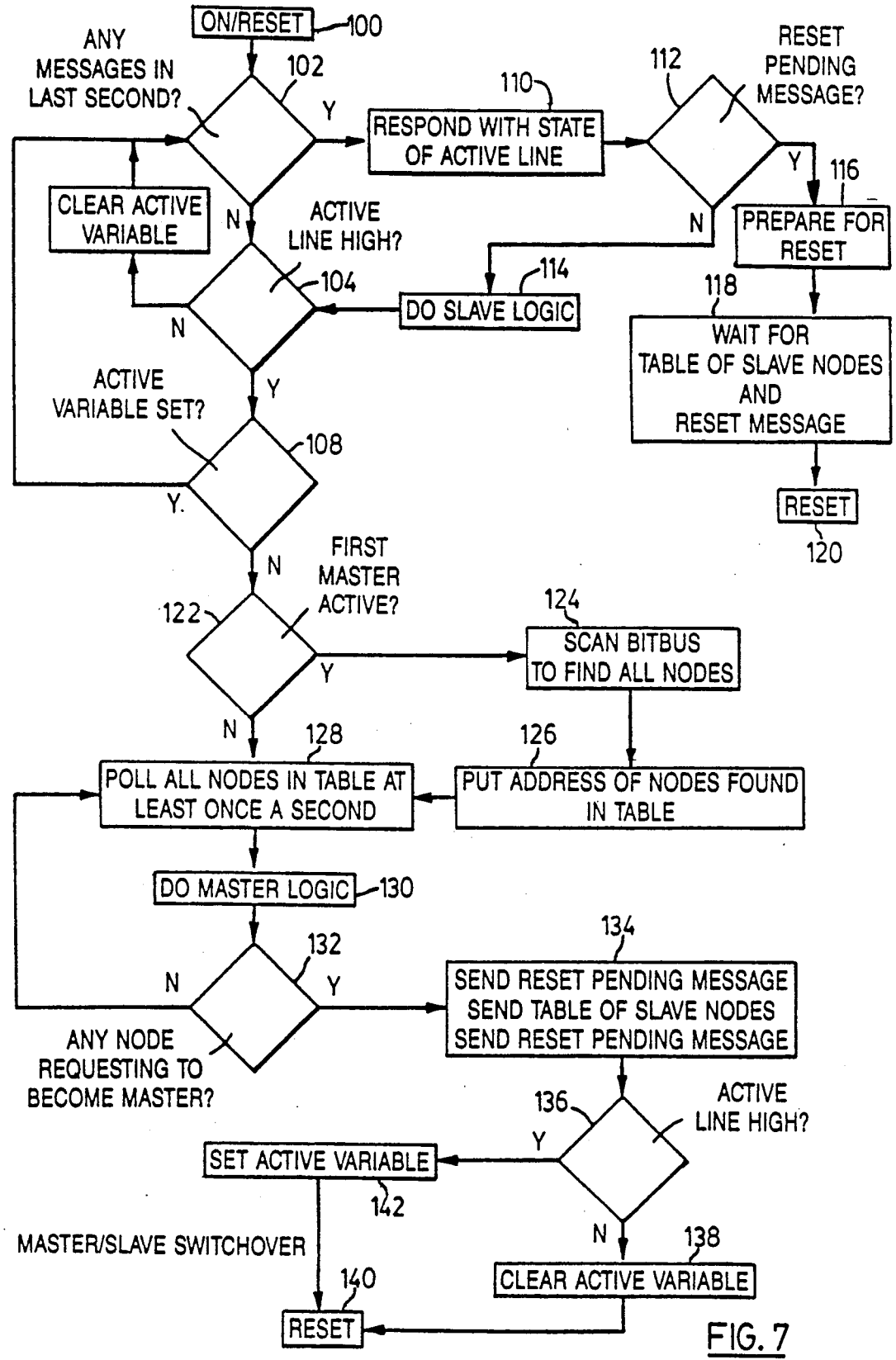
FIGS. 7 to 10 are flow charts illustrating the steps performed by the control system illustrated in FIG. 4.
Figure 8:
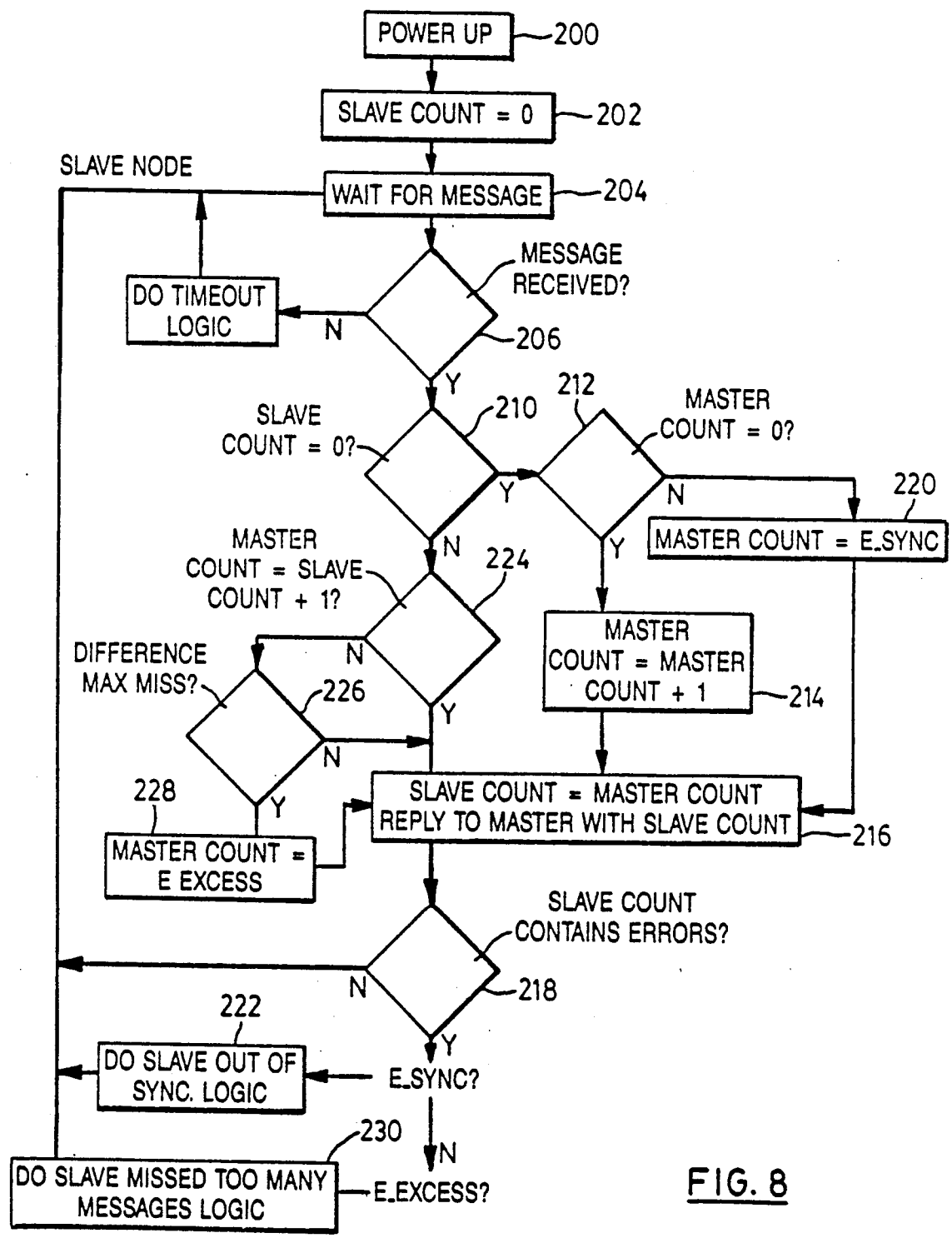

Referring now to FIG. 7, when the vehicle 10 is powered up and the master RCIU 48 has been determined, the master RCIU 48 moves from block 102 to block 122 via blocks 104, 108 since no messages have been received and since the active variable line for the master RCIU 48 is detected as being high whilst the active variable at the master RCIU 48 is low. The other RCIUs 48 on the vehicle step through an identical program but loop back to block 102 awaiting receipt of a message via blocks 104,106 or block 108. The slave RCIUs 48 do not proceed past block 108 since the slave RCIUs 48 will either have a low active line or a high active line and set active variable. With respect to RCIUs 52 disposed on the vehicle 10, since in this embodiment, the RCIUs 52 are not permitted to assume the master role, the RCIUs are not provided with an active variable line or active variable. After power up, the RCIUs 52 simply follow a loop awaiting receipt of a message transmitted by the master RCIU 48.

Once the master RCIU 48 has proceeded to block 122, the master RCIU polls the communication link 50 to determine the number of other RCIUs 48,52 located on the vehicle (block 124). Once the number of nodes connected to the communication link 50 have been determined, the master RCIU 48 creates an address table as shown at block 126 and assigns each of the RCIUs 48,52 or slave nodes connected to the communication link 50 an address. In the embodiment shown, the RCIU 48 selected as the master node will assign the other RCIUs 48,52 addresses 22 to 28 with the master node being assigned node number 21. As mentioned previously, the address assigned to each RCIU is used in data communications so that messages transmitted by the master RCIU 48 are received and processed only by the slave RCIU to which the message is addressed.

Once the address table has been created, the communication link 50 is polled at least once a second (block 128) by the master RCIU 48 to determine whether any nodes have been removed or added to the communication link 50 to ensure that system integrity is maintained. With the aid of multi-tasking and multiplex communications, the master RCIU 48 is then capable of performing master logic as shown by block 130. This logic includes generating commands to operate the various vehicle sub-systems in a conventional manner and also performing high level error correction of messages in the form of replies received from the slave RCIUs 48,52.

The master RCIU 48 while performing vehicle operations also checks to determine whether another RCIU 48 is generating a request to assume the master role as is illustrated at block 132. A request to become master is generated by another RCIU 48 when the mode selection switch 43c at an active console 43 is actuated to another position to cause a change in state of an active variable line from low to high which will require a different RCIU 48 to assume the master role. If a request to become master from another RCIU 48 is not received, the master RCIU 48 loops through steps 128 and 130 allowing the vehicle to be operated in a conventional manner while monitoring the communication link 50 substantially continuously to detect whether any nodes have been added to or subtracted from the communication link 50.

However, if a request to become master is received by the master RCIU 48, the master RCIU 48 sends a reset pending message to the RCIU 48 requesting the master role. Thereafter, the master RCIU 48 transmits the address table of slave nodes to the requesting slave RCIU 48 along with another reset message (block 134). The address table is transmitted to the requesting RCIU 48 to reduce processing time when the requesting RCIU 48 assumes the master role and is required to create a node table as shown at block 126. Since all of the slave RCIUs are connected to the master RCIU 48 via the communication link 50, all slave RCIUs receive the reset pending messages, and address table. However, only the requesting RCIU 48 interprets the information due to the addressing of all data transmission on the communication link 50.

Once an RCIU 48 has generated a request to become the master and the information of block 134 is conveyed to the RCIU 48, the requesting RCIU 48 proceeds from block 102 to block 110 and conveys the status of it's active line, this being "high" or "low". This is necessary since it is a change in state of the active line from low to high which causes the RCIU 48 to request to generate a become the master and not the value of the active line.

Once step 134 has been completed and the state of the active line associated with the RCIU generating a request to assume the master role has been received at the master RCIU 48, the active line associated with the requesting RCIU 48 is examined (block 136) to determine if it's state is high. If the active variable line at the requesting RCIU 48 is detected as being low, the active variable at the master RCIU 48 is cleared (block 138) to a low condition and the former master RCIU 48 resets as shown by block 140. If the active line at the requesting RCIU is detected as being high, the active variable at the former master RCIU 48 is set to a high state and the former master RCIU resets as shown by blocks 142 and 140 so that the former master RCIU 48 can assume a slave role.

After the RCIU 48 generating a request to assume the master role has responded to the master RCIU by providing the state of it's active line, the message received from the master RCIU 48 is examined by the RCIU 48 which has generated the request to assume the master role to determine whether a reset pending message has been received from the master RCIU 48 as shown by block 112. If a reset pending message has not been received, the RCIU performs slave logic since the message is considered to be a command generated by the master RCIU. The RCIUs 52 which cannot assume the master role simply proceed to block 114 when a message is received from the master RCIU 48 that is addressed thereto. The slave logic includes operating its associated sub-system per the instructions of the command received by the master and performing high level error checking on the received data transmission as will be described. Once the slave logic has been performed by the RCIU, the active variable line at the slave RCIU is examined to detect if it is high (block 104). If the active line is detected as being low, the active variable at the slave RCIU is cleared and the slave RCIU awaits receipt of another message from the master RCIU.

However, if the active line at the slave node is detected as being high, the active variable is examined to determine if it has been set (block 108). If the active variable has been set, the RCIU reverts back to block 102 and awaits receipt of another message from the master RCIU 48. These are the typical paths followed by the slave RCIUs unless a request to become master has been generated by a slave RCIU. If a message has not been received by the slave RCIU within a second, the slave RCIU proceeds through blocks 102 to 108.

If a slave RCIU requesting the master role receives the reset pending message from the master RCIU performing step 134, the slave RCIU prepares to be reset as shown at block 116 and awaits receipt of the node address table and the second reset message from the master RCIU as shown at block 120. Once the information has been received by the requesting RCIU, the slave RCIU resets (block 120) and reverts back to block 100. During the reset, the RCIU 48 generating the request to become the master is given a high active line and a low active variable. Thus, the RCIU 48 which generates the request to assume the master role proceeds to block 122 via blocks 102, 104 and 108 after reset occurs and assumes the master role. The new master RCIU then establishes a node address table (block 126) and assumes the master role. The other RCIUs in the system 40 and the former master RCIU will have either a low active line and a low active variable or a high active line and a set active variable and thus, will loop around blocks 102 to 108 until a message is received from the new master RCIU.

When a message in the form of a command is generated by the master RCIU as shown by block 130, the message is provided with a logic low command bit and is assigned an address so that the message will only be received and processed by the slave RCIU to which it is addressed. For example, if the mode selection switch 43c is conditioned to the manual mode of operation at an active console 43, the RCIU 48 connected to the console logic controller 42 associated with the active console 43 assumes the master role as described above. If the operator depresses a door open button 43d on the active console 43, the console logic controller 42 detects this and generates a control signal to operate the doors to the open position in a conventional manner. The control signal generated by the console logic controller 42 is conveyed to the RCIU 48 which receives the message and places it in the proper "BitBus" message format. This message will be given a logic low command bit since it is a command message generated by the master RCIU 48 and will be addressed to the RCIU 52 connected to the door control sub-system 30.

Once the message has been properly formatted by the master RCIU 48, it is conveyed along the communication link 50 and is received by all of the RCIUs 48, 52 connected to the communication link 50. The address of the message is then examined by the RCIUs to determine if the message is directed to that RCIU as shown at block 206 of FIG. 8. Looking at FIG. 8, if the message is not directed to the RCIU, the RCIU does timeout logic 208 and reverts back to a pre-condition state awaiting receipt of the next data transmission occurring over the communication link 50 as indicated at blocks 208 and 204. The timeout logic 208 is also represented by blocks 102 to 108 in FIG. 7.

If the message is detected as being addressed to the RCIU, a slave count at the slave RCIU 48,52 is examined to detect its value as shown at block 210. If the value of the slave count is equal to zero, the message received by the RCIU is considered to be the first message received by the RCIU since power up of the IVCCS 40. This is due to the fact that the slave count for each RCIU is set to zero after power up of the system 40 (blocks 200 and 202). Once the message is received, the first byte or master count of the message is examined (block 212) as this portion of the message does not represent part of the command generated by the master RCIU 48 but rather high level error correction data. A copy of the master count transmitted to the slave RCIU in the command is maintained at the master RCIU. If the master count is equal to zero, the master count is incremented as shown by block 214. Thereafter, the slave count is set equal to the master count (block 216) and the slave count is examined to determine if the slave count value is equal to one of two values E_sync and E_excess that are associated with errors (block 218).

If the slave count is equal to a value other than one of the two error values, the slave RCIU is considered in sync. with the master RCIU (i.e. data transmissions therebetween have not been lost) and the slave RCIU executes the command generated by the master RCIU 48 prior to reverting to block 204 to await receipt of the next command generated by the master RCIU. Thus, for example, if the door open message generated by the master RCIU 48 is received by the slave RCIU 52 associated with the door control sub-system 30 and the slave and master counts check so that the slave RCIU 52 completes step 218 in the no condition, the command is processed further. When this occurs, the command received by the RCIU 52 is applied to the door control sub-system 30 in the same form as the control signal generated by the console logic controller 42. The door control sub-system 30 in turn processes the control signal in a conventional manner and opens the doors in accordance with the command. The door control sub-system 30 in turn generates a reply message to the console logic controller 42 to confirm operation of the doors 28 in the desired manner.

The reply generated by the door control sub-system 30 is received by the RCIU 52 and is formatted to confirm with the "BitBus" message structure. The reply message to be transmitted to the master RCIU is assigned a logic high command bit signifying that the message to be transmitted is a reply to the master RCIU 48. The slave RCIU 52 then addresses the reply to the master RCIU 48 and transmits it along the communication link 50. Since the message is addressed to the master RCIU 48, although every RCIU connected to the communication link receives the message, only the master RCIU 48 responds to it.

However, if the master count is examined and determined not to equal zero, the slave RCIU is detected as being out of sync. with the master. This is due to the fact that the slave RCIU should have a slave count equal to a value one greater than the master count except upon reception of the first message by the slave RCIU in which case the master and slave counts should be equal. The slave RCIU should not enter this part of the routine unless the RCIU considers the message received as being the first message. Accordingly, when this condition is detected, the master count is set to a value equal to the first error value E_sync as indicated at block 220. This situation indicates that the slave RCIU has not received any messages transmitted by the master RCIU. Once the master count has been set to this value, the slave count is set to the value assigned the master count (block 216).

Once this has been done, the value of the slave count is examined to determine whether the count is equal to either E_sync. or E_excess as illustrated by block 218. Since in this case the value of the slave count is equal to E_sync, the slave RCIU proceeds to block 222 wherein slave out of sync logic is performed. The logic performed by the slave RCIU can be any function and in this case the out of sync logic causes the slave RCIU to convey a message to the master RCIU. The master RCIU upon receipt of this message may operate the braking sub-systems on the vehicle 10 to bring the vehicle to a stop if the sub-system associated with the slave RCIU is vital for safe operation of the vehicle or may simply cause the master RCIU 48 to update a health status report. If the vehicle 10 is stopped by the out of sync logic, the system 40 must be reset so that operation of the vehicle 10 can be resumed.

If the message received by the slave RCIU is other than the first message, the slave count will be detected at a value greater than zero when processed by block 210 since the RCIU will have previously passed through block 216. Once this condition is detected, the master count is examined to determine whether the value of the master count is one greater than the value of the slave count as is illustrated by block 224. If this condition is detected, the value of the slave count is set to equal the value of the master count (block 216) and the value of the slave count is examined to determine if it has been set to a value equal to E—sync., or E—excess (block 218). If the slave count does not equal any of these values, as is the case if the slave RCIU meets the 'Y' requirements of block 224, the command received by the slave RCIU is executed in the same manner described above.

If the value of the master count is detected as being greater than the value of the slave count plus one, the difference between the master count and the slave count is examined as shown by block 226. If the detected difference is below a threshold value, the slave count is set equal to the master count to bring the slave RCIU back into sync with the master RCIU (block 216). This will permit a small number of transmission errors to be tolerated without causing the slave RCIU to perform error logic. However, if the difference is detected as being greater than the threshold value, the master count is set equal to the value E—excess (block 228). When this occurs, the slave RCIU is informed that an unacceptable number of messages transmitted to the slave RCIU from the master RCIU 48 have been corrupted over the communication link 50 and have been rejected by the "BitBus" error correction mechanism.

Once the master count has been set to the E—excess value, the slave count is set to equal the value of the master count (block 216). The slave count is then examined and detected as being equal to one of the two error values, in this case E—excess as is shown by block 218. When this condition occurs, the slave RCIU can be programmed to perform any function. In this case, the slave RCIU conveys a preset message to the master RCIU. The master RCIU receives the message and in turn generates command signals to operate the train in a pre-determined manner (block 230).

As mentioned previously, once a slave RCIU has received a message and performed the various high level error detection as well as performed the operation required, the slave RCIU replies to the master RCIU 48 to confirm operation of the sub-system in the desired manner. When replying to the master RCIU 48, the slave RCIU sends a message to the master RCIU in the same format that the master transmits messages to the slave RCIUs. This includes transmitting the up-dated value of the master count calculated at the slave RCIU along with the reply to the master RCIU 48.

Figure 9:
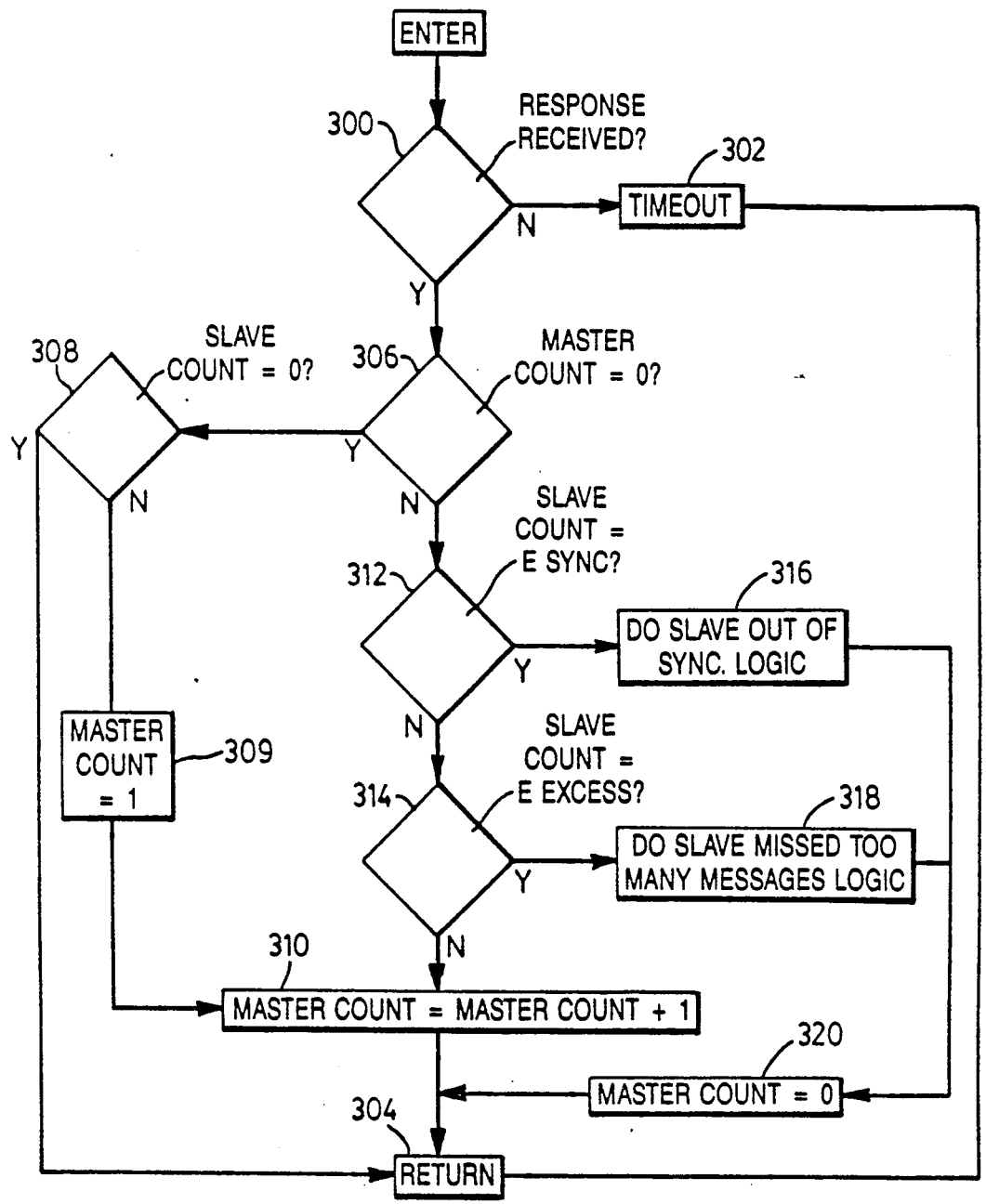

Accordingly, after a command has been conveyed to a slave RCIU from the master RCIU 48, the master RCIU 48 awaits receipt of a response from the slave RCIU as shown by block 300 in FIG. 9. If a response is not received by a pre-determined time, the master RCIU performs timeout logic and resets as shown by blocks 302 and 304. If a response is received by the master RCIU 48, the master count originally sent to the slave RCIU which is copied by the master RCIU prior to transmission stored in the master RCIU is examined by the master RCIU as shown by block 306. If the master count is detected as being equal to zero, the slave count or up-dated master count transmitted by the slave RCIU is also examined (block 308). If the slave or up-dated master count is detected as being greater than zero, the master count is incremented (block 309) and the master node resets as illustrated by blocks 310 and 304. However, if the slave or up-dated master count is detected as being equal to zero, the master node simply rests (block 304).

If the master count is detected as being greater than zero at step 306, the slave or up-dated master count is examined to determine whether the count transmitted by the slave RCIU is equal to E—sync or E—excess as shown by blocks 312 and 314. If either of these conditions is detected, the master RCIU performs special logic in accordance with pre-programmed information stored therein, (blocks 316,318) and the master count stored in the master RCIU is set equal to zero as illustrated at block 320 before the master RCIU 48 returns to block 300. If the slave count does not attain the E—sync or E—excess values, the master count is incremented before the master RCIU 48 reverts to block 300.

This error correction performed by the IVCCS 40 is necessary since corrupted data on the "BitBus" system is not acknowledged by any nodes. Thus, for example, if the master node transmitted three messages to a slave node which were corrupted during transmission along the communication link 50, the slave node would not receive any of the three messages. If a fourth message was then received by the slave node, since the IVCSS 40 implements an internal message transmission failure detection scheme, the system is able to detect that corruption of the first three messages occurred and thus is able to compensate for the transmission problems in the system 40. Otherwise, if this correction were not in place, the corrupted messages would not be detected and operation of the vehicle 10 would be seriously impaired.

As mentioned previously, if a slave RCIU 48,52 becomes isolated from the master RCIU 48 due to failure of the communication link 50, the slave RCIU does not await commands from the master RCIU 48, but rather uses the pre-determined operation information stored therein to operate the sub-system connected thereto.

Similarly, if the master RCIU 48 becomes isolated from the communication link 50, the other RCIUs connected to the communication link operate in the preprogrammed manner. These situations can be detected easily by monitoring the amount of time via the timeout logic 208 that has elapsed waiting for a message from the master RCIU.

It should also be apparent that the master RCIU 48 can be programmed via the E—sync or E—excess logic to transfer the master role to another RCIU 48 if excessive errors occur. This is achieved by causing the master RCIU 48 to generate the first reset pending message addressed to one of the RCIUs upon detection of the excess errors which will cause the RCIU receiving the message to proceed to block 116 of FIG. 7 and await receipt of the node table and second reset pending message from the master. Transfer of the master role can then be effected in the manner described above.

Figure 10:
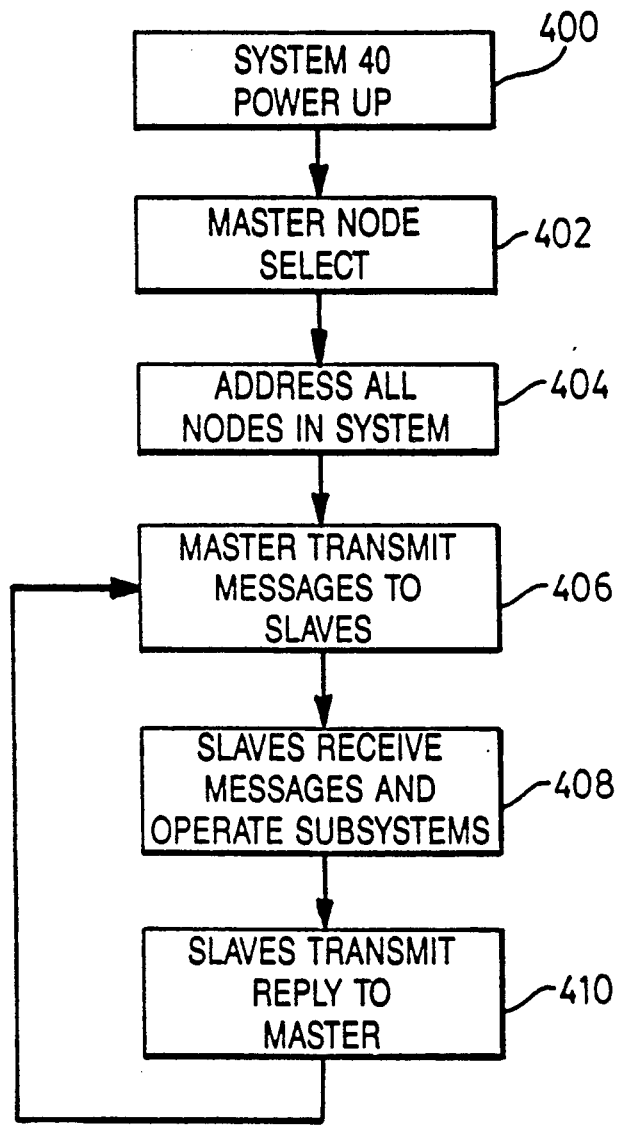

FIG. 10 shows a flow chart outlining the general system 40 operation. As can be seen, once the system 40 is powered up (block 400), the master node is determined (block 402). Thereafter, the master RCIU 48 addresses all nodes in the system (block 404) and operation of the system 40 can begin. The master RCIU 48 then communicates with the sub-system connected thereto, this being either the VOBC 46 or the console logic controller 42 and awaits receipt of vehicle operation control signals. When vehicle control signals are received, they are addressed to the slave RCIUs associated with the sub-systems that are to be operated and transmitted along the communication link 50 (block 406). The slave RCIU to which the control signal is addressed receives the message and conveys the control signals to the sub-system associated therewith. The sub-system in turn operates in accordance with the control signals and provides a reply confirming the operation of the sub-system (block 408). The reply is transmitted by the slave RCIU and received by the master RCIU 48 so that confirmation of the sub-system operation can be acknowledged and recorded by the master (block 410).

The operation of a train comprising at least two interconnected vehicles is very similar to the operation of a single vehicle described above. In the train environment, only one RCIU in the train is designated as a master and all other RCIUs on the train are designated as slaves. Any of the RCIUs 48 operating as slaves in a train can assume and request the master role upon movement of a mode selection switch 43c on an active manual console 43 between positions to cause a change in state on one of the active variable lines from a low to a high condition.

When a vehicle is to become part of a train, the manual console 43 on the vehicle is conditioned so that all RCIUs on the vehicle 10 are in a standby state (i.e. there is no master or slave RCIUs). Thereafter, the vehicle is connected to another vehicle 10 on train. The master RCIU 48 on the existing train which continuously polls the communication link 50 to detect all nodes on the link 50 (block 128 of FIG. 7), will detect the RCIUs on the vehicle being coupled to the train. This is due to the fact that the communication link 50 on the vehicle 10 becoming part of the train engages with the communication link 50 extending through the train. The master RCIU at that time does a reset and creates a new node address table consecutively numbering the new nodes on the train (blocks 124 and 126 of FIG. 7). For example, if a train comprising three vehicles with each vehicle including three RCIUs is to be established, the train would include a total of nine RCIUs with one RCIU being designated as the master node. Using the node numbering convention mentioned earlier for a single vehicle, the master node assigns itself address 21 and the remaining eight RCIUs are addressed consecutively as 22 to 29 respectively. If two interconnected vehicles are to be connected to the train, the interconnected vehicles are firstly conditioned so that all RCIUs on the vehicle are in a standby state.

The interconnected vehicles are then coupled to the train so that the communication link 50 of the train engages with the communication link 50 extending through the two vehicles. The master RCIU detects the six new RCIUs connected to the train during a poll of the communication link 50 and immediately creates a new node table numbering the nodes of the train consecutively from 21 to 35. The convention of numbering the master node as address 21 is selected to allow a maximum of four interconnected vehicles each having five RCIUs provided thereon connected to a train without address overlapping occurring. However, this is simply convention and can be changed to suit the environment. Since the master RCIU does this automatically, vehicles can be placed on or removed from the train without disabling the train.

It should be apparent to one of skill in the art that the present system provides advantages in that control system complexity is reduced. Furthermore, the present system permits vehicles to be added to or subtracted form a train without requiring the train to be disabled. Moreover, the master control of the train and vehicle can be switched between vehicles or between a manual console and VOBC on a vehicle without requiring the train or vehicle to be disabled. Also, the transmission failure detection means provided in the present system allows the operation of the system to be monitored and operated in a safe manner if transmission error occurs.

It should also be apparent to one of skill in the art that various modifications can be made to the present system to permit control of the train or individual vehicles 10 in a desired manner.

We claim:

1. An on-board control and communication system for use on a vehicle, said vehicle being operable as a single unit or being coupled to at least one other vehicle to form a train, one of said vehicles in said train operating as a master for controlling the operation of said train and the other vehicles in said train operating as slaves responsive to said master, each of said vehicles including a control and communication system, comprising:

at least one slave control means responsive to command signals and controlling a sub-system of said vehicle in accordance with said command signals;

master control means connected to said slave control means via a communication link, said master control means generating said command signals upon reception of an enabling signal and in response to desired vehicle operation information, said communication link being coupled to the communication link in other vehicles when vehicles are coupled to form a train;

detection means for detecting when said vehicle is coupled to another vehicle to form a train and for detecting the vehicle in said train designated as said master; and conversion means in communication with said detection means for generating said enabling signal when said vehicle is designated and operates as said master, said slave control means on each of said vehicles further including pre-programmed sub-system operation information stored therein and executing said operation information upon loss of communications with said master control means to control the sub-system in the absence of command signals generated by the master control means.

2. The system as defined in claim 1, wherein said master and slave control means are in the form of microprocessor based controllers, the master controller on the vehicle designated as the master creating an address list including each master controller on vehicles operating as slaves in said train and each slave controller on vehicles in said train, said master controller also including means to monitor said train to determine the number of slave vehicles connected thereto and means for automatically revising said address list upon coupling or uncoupling of a vehicle to or from the train.

3. The system as defined in claim 2 wherein said communication link is in the form of a multiplex communication link.

4. The system as defined in claim 3 wherein said multiplex communication link is formed from a pair of twisted conductors.

5. The system as defined in claim 3, wherein each of said master and slave controllers is coupled to said multiplex communication link in parallel, said master controller and slave controllers on each vehicle receiving all of said command signals generated by the master controller in said train, said command signals being addressed by said master controller to a particular slave controller, said slave controllers responding only to command signals addressed thereto.

6. A train comprising:
  at least two interconnected vehicles, one of said vehicles operating as a master and controlling the operation of said train, the other vehicles operating as slaves and being responsive to said master, each of said vehicles comprising:
  a communication link linking with the communication link in the other vehicles froming said train;
  control means operable to control the operation of said train when said vehicle is designated as said master and operable to control subsystems on said vehicle in response to commands generated by said master when said vehicle is designated as a slave;
  request means in communication with said control means and being enabled when said vehicle is operating as a slave, said request means generating a master request signal in response to a master role change request;
  detection means enabled when said vehicle is operating as said master and operable to detect a master request signal generated by the request means on a vehicle operating as a slave; and
  conversion means for converting said master to a slave upon detection of said master request signal and converting said slave to said master upon generating of said master request signal automatically without disabling said train, said control means further including pre-programmed sub-system operation information stored therein, said control means on said vehicles operating as slaves executing said operation information upon loss of communications with said master to control the sub-systems in the absence of commands generated by the master.

7. The train as defined in claim 6 wherein said control means comprises a master controller and at least one slave controller, said slave controller being responsive to command signals generated by a master controller to control a pre-determined function of said vehicle, the master controller being operable to control the overall operation of said vehicle, wherein the master controller of said vehicle operating as said master generates command signals to control the vehicles in said train, the master controllers in the slave vehicles functioning as slaves responsive to said master.

8. The train as defined in claim 7 wherein said master and said slave controllers are interconnected via a multiplex communication link, said multiplex communication link in each of said vehicles in said train being interconnected.

9. The train as defined in claim 8 wherein said master controller in the vehicle operating as said master assigns an address value to each of the other master and slave controllers on said train, said master controller operating as said master providing said command signals with an address, said controllers responding to said command signals only when the address of said command signal corresponds with the address value assigned to said controller.

10. The train as defined in claim 9 wherein said master role is transferable between said vehicles upon generation of said master request signal by a master controller located on a vehicle operating as a slave, said master controller on said master vehicle assuming a slave role upon receipt of said master request signal, said master controller on said slave vehicle assuming said master role upon generation of said master request signal and generating a new address value for each of said controllers in said train.

11. The train as defined in claim 10 wherein said slave and master controllers are in the form of microprocessor based circuits.

12. The train as defined in claim 11 wherein said master controller in the vehicle operating as said master continuously monitors the number of vehicles in said train and re-assigns an address value to each of said controllers in said train upon removal or addition of a vehicle to said train.

13. An on-board control and communication system for use on a vehicle comprising:
  operator control means operable to control the operation of said vehicle in response to commands received from an operator;
  automatic control means operable to control the operation of said vehicle in a pre-programmed manner;
  mode selection means in communication with said operator control means and said automatic control means, said mode selection means being operable between first and second conditions to enable one of said operator control means and automatic control means;
  monitoring means monitoring said mode selections means to detect actuation of said mode selection means from one condition to the other condition, said monitoring means automatically enabling the control means associated with said other condition and disabling the control means associated with said one condition without disabling said vehicle upon actuation of said mode selection means from said one condition to said other condition; and
  means to enable said automatic control means and disable said operator control means independent of said mode selection means upon malfunction of said operator control means.

14. A control and communication system as defined in claim 13 further comprising a second operator control means, said first and second operator control means being located at opposite ends of said vehicle and each having mode selection means associated therewith, each of said mode selection means being operable to select one of said automatic control means and said associated operator control means.

15. A control and communication system as defined in claim 14 wherein said operator control means includes an operator console and said mode selection means is a mode selection switch disposed on said console, said switch being moveable between first and second positions to select one of said automatic and operator control means for said vehicle, said monitoring means detecting movement of said switch between said positions.

16. A control and communication system as defined in claim 15 wherein said automatic control means is in the form of a vehicle on board controller, said controller including memory means for storing pre-determined vehicle operation information and controlling said vehicle in accordance with said information when said mode selection switch is positioned to select said automatic control means or when said automatic control means is enabled due to malfunction of said operator control means.

17. A control and communication system as defined in claim 15 further including a modular microprocessor based circuit in communication with each of said operator consoles and said vehicle on board controller, said microprocessor based circuits being interconnected via a communication link and including software for monitoring said mode selection switches and the operation of said operator control means thereby constituting said monitoring means and said means to enable said automatic control means.

18. A control and communication system as defined in claim 17 wherein said operator console generates a mode change signal upon actuation of said mode selection switch between said positions, said microprocessor based circuit associated with the control means selected by the mode selection switch detecting said mode change signal and enabling the control means associated therewith, the microprocessor based circuit associated with the previous selected control means disabling said previously selected control means.

19. A control and communication system as defined in claim 17 further including a plurality of sub-systems connected in parallel to said communication link, said sub-systems being operable to control a pre-determined function of a vehicle in response to control signals generated by said enabled control means, said enabled control means assigning an address to each of said subsystems and addressing each of said control signals, said sub-systems responding only to control signals addressed thereto.

20. A control and communication system as defined in claim 19 wherein said enabled control means and each of said sub-systems include count means, said enabled control means having a count means associated with each of said sub-systems and incrementing the count means associated with a sub-system to which a control signal has been sent, the value of the count means being transmitted to said sub-system with said control signal, said sub-system incrementing said count means upon reception of each control signal received that is addressed thereto and comparing the value of the count means with the transmitted value to detect messages transmitted by the enabled control means not received by said sub-system.

21. A control and communication system as defined in claim 20 wherein said sub-systems include memory means storing pre-determined operation information, said sub-system executing said operation information when said transmitted value differs from the value of said count means by a value greater than a threshold value.

22. A control and communication system as defined in claim 19 wherein said sub-systems include memory means storing pre-determined operation information, said sub-system executing said operation information to control said function upon isolation of said sub-system from said enabled control means due to failure of said communication link.

23. A train comprising:
at least two interconnected vehicles, one of said vehicles operating as a master and controlling the operation of the train, the other of said vehicles operating as slaves and being responsive to said master, said master including control means generating commands addressed to particular slaves, each of said slaves including control means responsive to commands generated by said master which are addressed thereto, said master vehicle including monitoring means for continuously monitoring said train to determine the number of vehicles in said train and generating an address list including each of said detected vehicles in said train and update means for updating said address list automatically upon addition or subtraction of a vehicle to or from said train without impeding control of said train by said master.

24. A train as defined in claim 23 wherein said master includes a count means associated with each of said slaves and each of said slaves includes count means, said master incrementing the count means associated with the slave to which a command has been sent, the value of the count means being transmitted to said slave with said command, said slave incrementing said count means upon reception of each command received that is addressed thereto and comparing the value of the count means with the transmitted value to detect messages transmitted by the master not received by the slave.

25. The train as defined in claim 24 wherein said slaves include memory means storing pre-determined operation information, said slaves executing said operation information when said transmitted value differs from the value of the count means at said slave by a value greater than a threshold value.

26. An on-board vehicle control and communication system for use on a vehicle comprising:
a master controller in the form of a microprocessor based circuit responsive to vehicle operation signals representing desired vehicle operation, said master controller generating command signals in response to said vehicle operation information;
at least one slave controller in the form of a microprocessor based circuit and controlling the operation of a subsystem on said vehicle;
a communication link interconnecting said master and said at least one slave controller, said slave controller being responsive to command signals generated by said master controller and controlling the operation of said subsystem in accordance with said command signals, said at least one slave controller further including sub-system pre-programmed operation information therein and executing said operation information upon loss of communications with said master controller.

27. The system as defined in claim 26 wherein said pre-programmed operation information is in the form of a plurality of executable programs, each program being associated with a specific fault in said system resulting in the loss of communications, said slave controller executing one of said programs when said associated fault is detected.

28. The system as defined in claim 27 wherein one of said specific faults includes the isolation of said slave controller from said master controller, said slave controller executing the program associated with said one fault and controlling the operation of said subsystem in a preprogrammed manner in the absence of command signals from said master controller.

29. The system as defined in claim 28 wherein another of said specific faults is the loss of command signals generated by said master controller over said communication link, said slave controller executing the program associated with said fault to inform said master controller that command signals generated thereby are not being received by said slave controller.

30. The system as defined in claim 28 further including a plurality of slave controllers each controlling a sub-system of said vehicle, at least one of said slave controllers including said program associated with said one fault.

31. The system as defined in claim 30 wherein each slave controller controlling a sub-system associated with a vital function of said vehicle includes a program associated with said one fault.

* * * * *